US010595256B1

United States Patent
Marupaduga et al.

(10) Patent No.: US 10,595,256 B1
(45) Date of Patent: Mar. 17, 2020

(54) DYNAMICALLY MANAGING RELAY NODES IN A WIRELESS NETWORK

(71) Applicant: Sprint Spectrum LP, Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/513,849

(22) Filed: Jul. 17, 2019

(51) Int. Cl.
| | |
|---|---|
| *H04W 76/11* | (2018.01) |
| *H04W 36/26* | (2009.01) |
| *H04W 36/22* | (2009.01) |
| *H04W 36/08* | (2009.01) |
| H04W 84/04 | (2009.01) |

(52) U.S. Cl.
CPC ............ *H04W 36/26* (2013.01); *H04W 36/08* (2013.01); *H04W 36/22* (2013.01); *H04W 84/047* (2013.01)

(58) Field of Classification Search
CPC ............................ H04W 76/11; H04L 12/4641
See application file for complete search history.

(56) References Cited

U.S. PATENT DOCUMENTS

| | | | |
|---|---|---|---|
| 9,467,909 B2 | 10/2016 | Faerber et al. | |
| 10,419,992 B2* | 9/2019 | Van der Merwe | ........................... H04L 12/4641 |
| 2019/0182875 A1* | 6/2019 | Talebi Fard | .......... H04W 76/11 |

OTHER PUBLICATIONS

Elnashar et al., "Performance Evaluation of VoLTE Based on Field Measurement Data," VoLTE 2018 Paper arXiv.org > cs > arXiv:1810.02968 www.u5gig.ae (2018).
Mewari, Laxman, "LTE UE Event Measurement Reporting-Event A1, A2, A3, A4, A5, B1, B2," https://www.linkedin.com/pulse/lte-ue-event-measurement-reporting-event-laxman-mewari pp. 1-5 (Apr. 2019).
Tabany & Guy, "An End-to-End QoS Performance Evaluation of VoLTE in 4G E-UTRAN-based Wireless Networks," ICWMC 2014: The Tenth International Conference on Wireless and Mobile Communications IARIA, 2014 ISBN: 978-1-61208-347-6 pp. 90-97 (2014).
Villaluz et al., "VoLTE SRVCC Optimization as Interim Solution for LTE Networks with Coverage Discontinuity," IEEE ICTC 2015 MOTiV Research Co., Tokyo, Japan pp. 212-216 (Oct. 2015).

\* cited by examiner

*Primary Examiner* — William D Cumming

(57) ABSTRACT

Methods, processing nodes, and systems are provided for managing relay nodes in a wireless network. A number of relay nodes attached to a donor access node can be determined. A number of latency sensitive wireless devices attached to the relay nodes can be determined. A latency sensitive wireless device can be a wireless device running a latency sensitive application. A latency sensitive relay node can be a relay node attached to the donor access node having an attached latency sensitive wireless device. A maximum number of relay nodes attached to the donor access node can be set, for example, based on the number of latency sensitive wireless devices attached to latency sensitive relay nodes.

20 Claims, 7 Drawing Sheets

DYNAMICALLY MANAGING RELAY NODES IN A WIRELESS NETWORK

TECHNICAL BACKGROUND

As wireless networks evolve and grow, there are ongoing challenges in providing high-quality service to increasing numbers of wireless devices in various coverage areas of a wireless network. One approach to improving service quality and coverage is to implement relay nodes for relaying communication between a base station or donor access node, and an end-user wireless device. Relay nodes can be used at the edge of a coverage area of a donor access node to improve coverage and service, as well as in crowded areas having a high number of other wireless devices. However, relay nodes can be limited in their ability to effectively service wireless devices that are attached to it, particularly if the donor access node is serving numerous relay nodes. These issues are especially acute when multiple wireless devices are running latency sensitive applications, for example, voice, video streaming, gaming, and the like.

Overview

In accordance with the present disclosure, a method is provided that can comprise one or more of the following steps. A number of relay nodes attached to a donor access node can be determined. A number of latency sensitive wireless devices attached to the relay nodes can be determined. A latency sensitive wireless device can be a wireless device running a latency sensitive application. A latency sensitive relay node can be a relay node attached to the donor access node having an attached latency sensitive wireless device. A maximum number of relay nodes attached to the donor access node can be set, for example, based on the number of latency sensitive wireless devices attached to latency sensitive relay nodes.

In accordance with the present disclosure, a processing node is provided. The processing node can be configured to perform a method of maintaining quality of service for a wireless device running a latency sensitive application. The number of relay nodes attached to a donor access node can be determined. A number of latency sensitive wireless devices attached to relay nodes can be determined. A latency sensitive wireless device can be a wireless device running a latency sensitive application. A latency sensitive relay node can be a relay node attached to the donor access node having an attached latency sensitive wireless device. A maximum number of relay nodes attached to the donor access node can be set, for example, based on the number of latency sensitive wireless devices attached to latency sensitive relay nodes.

In accordance with the present discloser, a cellular network system is provided. The cellular network system can comprise, for example, a first donor access node, a second donor access node, and a plurality of relay access nodes configured to attach to the first or second donor access nodes. For example, the system can be configured to perform, for example, one or more of the following steps. A number of relay nodes comprised by the plurality of relay nodes that are attached to the first donor access node can be determined. A number of latency sensitive wireless devices attached to a relay node attached to the first donor access node can be determined. The latency sensitive wireless device can be a wireless device running a latency sensitive application. A latency sensitive relay node can be a relay node attached to the first or second donor access node. A maximum number of relay nodes attached to the first donor access node can be set, for example, based on the number of latency sensitive wireless devices attached to latency sensitive relay nodes that are attached to the first donor access node.

DETAILED DESCRIPTION

The present disclosure provides methods, processing nodes, systems, and other features for successfully managing cellular networks handling wireless devices running latency sensitive applications communicating through relay nodes to a donor access node. Tracking the number of latency sensitive wireless devices can be used to set thresholds, maximum numbers of relays and/or wireless devices, parameters, or the like to help prevent relay nodes and donor access nodes from becoming overloaded and to preserve quality of service (QoS) for wireless users. The capabilities provided by the present disclosure allow high fidelity voice conversations, for example, over VoLTE, to be maintained even in busy areas such as urban centers, sports arenas, transportation hubs, conference centers, and college campuses. Live streaming of video can be handled with minimum or no interruptions in service. The features of the present disclosure also can ensure a more enjoyable gaming environment for players unburdened by delays and discontinuities in action. The latency sensitive application management features of the present disclosure also permit real time control of devices in the realm of the Internet of Things by minimizing delays that could endanger such devices and, in the case of autonomous vehicles, occupants and bystanders of such devices.

Aspects and embodiments of the present disclosure are described with reference to FIGS. 1-7. Although the figures show relay nodes near cell edges, that is merely an example, and relay nodes can be located anywhere within range of a donor access node. That is, a relay node can be, for example, relatively close to a donor access node, relatively close to a cell edge of a donor access node, or at any location in between. In accordance with the present disclosure, relay nodes can be fixed, temporarily located, freely mobile, or any combination thereof, for example in response to a change in use or demand in a given cell, group of cells, or network.

Figure 1:
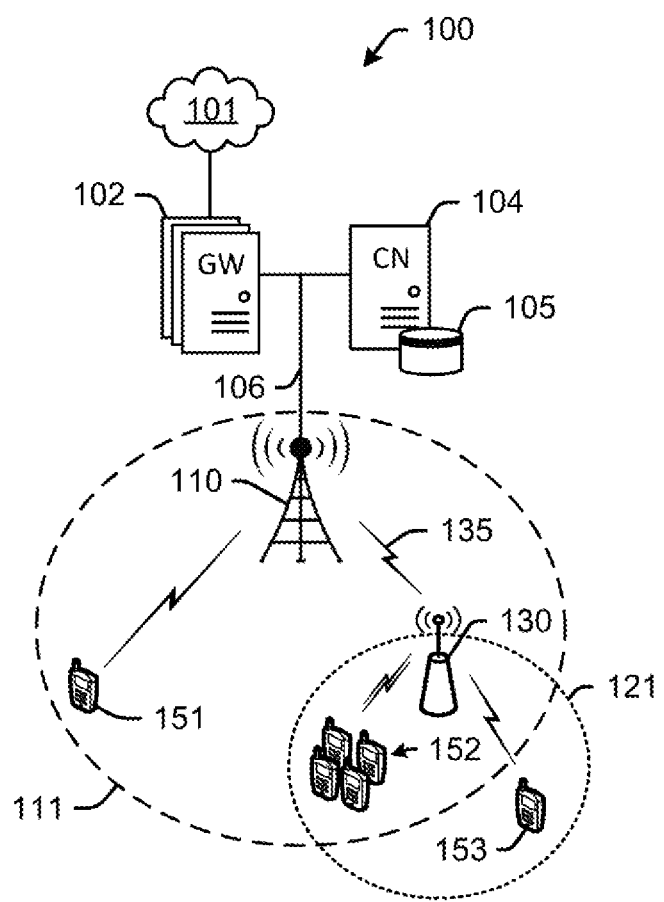
FIG. 1 is a schematic diagram of a system in accordance with the present disclosure.

FIG. 1 is a schematic diagram of a system 100, for example, a cellular network, in accordance with the present disclosure. The system can comprise any suitable element or combination thereof. Elements described for methods and processing nodes can be included in the cellular network system and vice versa. System 100 can perform a method in accordance with the present disclosure, for example, managing the number of relay nodes attached to a donor access node. System 100 comprises a communication network 101, a gateway 102, a controller node 104, a donor access node 110, a relay node 130, and wireless devices 151, 152, and 153. Donor access node 110 can be any network node configured to deploy a wireless air interface to which wireless devices 151, 152 and relay node 130 can attach, thereby gaining access to network services provided by network 101. Donor access node 110 can be, for example, a standard macrocell access node, such as a base transceiver station, a radio base station, an eNodeB device, or an enhanced eNodeB device. Donor access node 110 can be configured to provide network access to first wireless device 151 that is within coverage area 111 and attached directly to donor access node 110 over a wireless air interface deployed by donor access node 110. Wireless device 151 is illustrated as being near an edge of coverage area 111. Wireless device 152 is located near the cell edge of coverage area 111, and wireless device 153 is located outside a cell edge of coverage area 111. Wireless devices 152, 153 can attach to relay node 130, which is configured to relay network services from donor access node 110 to wireless devices 152, 153, and data packets therebetween.

Donor access node 110 can be further configured to deploy radio bearer 135, which can serve as a wireless backhaul link, to which relay node 130 can attach. As Relay node 130 can comprise a customer premise equipment (CPE), which can be, for example, any stationary wireless device having a stronger computational and radio capability versus standard wireless devices, as well as a directional antenna and a dedicated power supply, and an access point (AP) to which wireless devices 152, 153 can attach. For example, relay node 130 can further comprise any short range, low power, small-cell access nodes such as a microcell access node, a picocell access node, a femtocell access node, a home eNodeB device, or any other radio access technology (RAT) node or device. Relay node 130 can be configured to deploy another wireless air interface having coverage area 121. Wireless devices 152 can access network services using the combination of relay node 130 and wireless backhaul link 135. Wireless device 153 can access network services from donor access node 110 by attachment to relay node 130. Although only donor access node 110, relay node 130, and wireless devices 151-153 are shown in system 100, any other combination of access nodes, relay nodes, and wireless devices can be used in accordance with the present disclosure.

Access node 110 and relay node 130 can comprise a processor and associated circuitry to execute or direct the execution of computer-readable instructions to perform operations such as those further described herein. Access node 110 and relay node 130 can retrieve and execute software from storage, for example, a disk drive, a flash drive, memory circuitry, or some other memory device, and which can be local or remotely accessible. The software can comprise computer programs, firmware, or some other form of machine-readable instructions, and can include an operating system, utilities, drivers, network interfaces, applications, or some other type of software, or any combination thereof. Donor access node 110 and relay node 130 can receive instructions and other input at a user interface. Donor access node 110 communicates with gateway node 102 and controller node 104 via communication link 106.

Donor access node 110 and relay node 130 can communicate with each other, as well as other access nodes, for example, using a wireless link or a wired link such as an X2 link. Examples of components of donor access node 110 and relay node 130 are further described with reference to FIGS. 2-4.

Relay node 130 can be any suitable type of relay node capable of relaying a communication from donor access node 110 and wireless devices 152 and 153. Relay node 130 can be a latency sensitive relay node. Certain relay nodes can be predesignated as latency sensitive relay node (permitted to accept and/or maintain attachment of latency sensitive wireless devices), or relay node designations can be reassigned dynamically, or relay node designations can be reassigned periodically, or any combination thereof.

Wireless devices 151-153 can be any device, system, combination of devices, or other such communication platform capable of communicating wirelessly with donor access node 110 and/or relay node 130 using one or more frequency bands deployed therefrom. Each of wireless devices 151-153 can be, for example, a mobile phone, a smart phone, a wireless phone, a wireless modem, a personal digital assistant (PDA), a voice over LTE (VoLTE) device, a voice over internet protocol (VoIP) device, a voice over packet (VOP) device, a VoLTE via Generic Access (VoLGA) device, or any other suitable device configured to run a latency sensitive application, for example, voice, video, gaming, or real-time control, IoT related, or any combination thereof. Wireless devices 151-153 can be latency sensitive wireless devices by virtue, for example, for running a latency sensitive application.

The latency sensitive application can comprise any application or element thereof that is sensitive to delay such that delay can cause poor quality of service (QoS), diminished functionality, complete loss of functionality, or otherwise negatively impact an experience of the application user. The latency sensitive application can comprise, for example, a voice application, a video application, a gaming application, a real-time type application, a control application, or an Internet of Things (IoT) application, or any combination thereof. Prolonged latency in a voice application in impair the understanding of those involved in a conversation, in a video application can result in a lack continuity, and in a gaming application can prevent a player from being able to interact with other players, giving them an unfair advantage. The latency sensitive application can be circuit-switched, packet-switched, or both. The voice application can be a voice packet-based application, for example, voice over LTE (VoLTE) or voice over Internet protocol (VoIP). The latency sensitive application can be identified or chosen, for example, based on a predetermined list or set of qualifiers, for example, whether an application has a guaranteed bit rate (GBR), a high quality of service (QoS) class indicator (QCI), or both.

The active latency sensitive application can comprise, for example, at least two bearers comprising a default bearer and a dedicated bearer. The default bearer can comprise a first default bearer and a second default bearer. The dedicated bearer can comprise, for example, a guaranteed bit rate (GBR) and a QoS class indicator (QCI) of at least 2. QCI can be defined with respect to LTE, another technology convention, or otherwise. Each bearer can have a predetermined packet delay budget (PDB) and a packet loss rate (PLR). Any appropriate bearer or header can be employed.

Communication network 101 can comprise wired and/or wireless communication network components, and can comprise processing nodes, routers, gateways, and physical and/or wireless data links for carrying data among various network elements, including combinations thereof, and can include a local area network (LAN), a wide area network (WAN), and an internetwork (including the Internet). Wireless network 110 can be capable of carrying data, for example, to support voice, push-to-talk, broadcast video, and data communications by a wireless device, for example, wireless devices. Wireless network protocols can comprise, for example, Code Division Multiple Access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), Fifth Generation mobile networks or wireless systems (5G NR in SA (Stand Alone), 5G EN-DC in NSA (Non-Stand Alone), or any other RAT protocol, or any combination thereof. Wired network protocols that can be utilized by wireless network comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path, or any combination thereof. Communication link 106 can be wired or wireless and use various communication protocols, for example, Internet, Internet protocol (IP), local-area network (LAN), optical networking, hybrid fiber coax (HFC), telephony, Ti, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or any combination thereof. Communication link 106 can include S1 communication links. Other wireless protocols can also be used. Communication link 106 can be a direct link or include various equipment, intermediate components, systems, and networks. Communication link 106 can carry different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), and/or the like. Gateway node 102 is not limited to any specific technology architecture or protocol.

Gateway node 102 can comprise a processor and associated circuitry to execute or direct the execution of computer-readable instructions to obtain information. Gateway node 102 can retrieve and execute software from storage, which can include, for example, a disk drive, a flash drive, memory circuitry, or some other memory device, and which can be local or remotely accessible. The software can comprise, for example, computer programs, firmware, or some other form of machine-readable instructions, and can include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, and the like. Controller node 104 is not limited to any specific technology architecture or protocol.

Controller node 104 can comprise a processor and associated circuitry to execute or direct the execution of computer-readable instructions to obtain information. Controller node 104 can retrieve and execute software from storage, which can include, for example, a disk drive, a flash drive, memory circuitry, or some other memory device, and which can be local or remotely accessible. Controller node 104 can include a database 105 for storing information related to elements within system 100, such as presence and location of access node 110, relay node 130, and neighboring access nodes, device capabilities and locations of wireless devices such as wireless device 151, and so on. This information can be requested by or shared with access node 110 via communication link 106, X2 connections, and so on. The software can comprise computer programs, firmware, or some other form of machine-readable instructions, and can include an operating system, utilities, drivers, network interfaces, applications, or some other type of software, or any combinations thereof. For example, a processing node within controller node 104 can perform the operations described herein. Controller node 104 can receive instructions and other input at a user interface. Other network elements can be present in system 100 to facilitate communication, for example, base stations, base station controllers, mobile switching centers, dispatch application processors, location registers such as a home location register or visitor location register, additional processing nodes, routers, gateways, and physical and/or wireless data links for carrying data among the various network elements.

Figure 2:
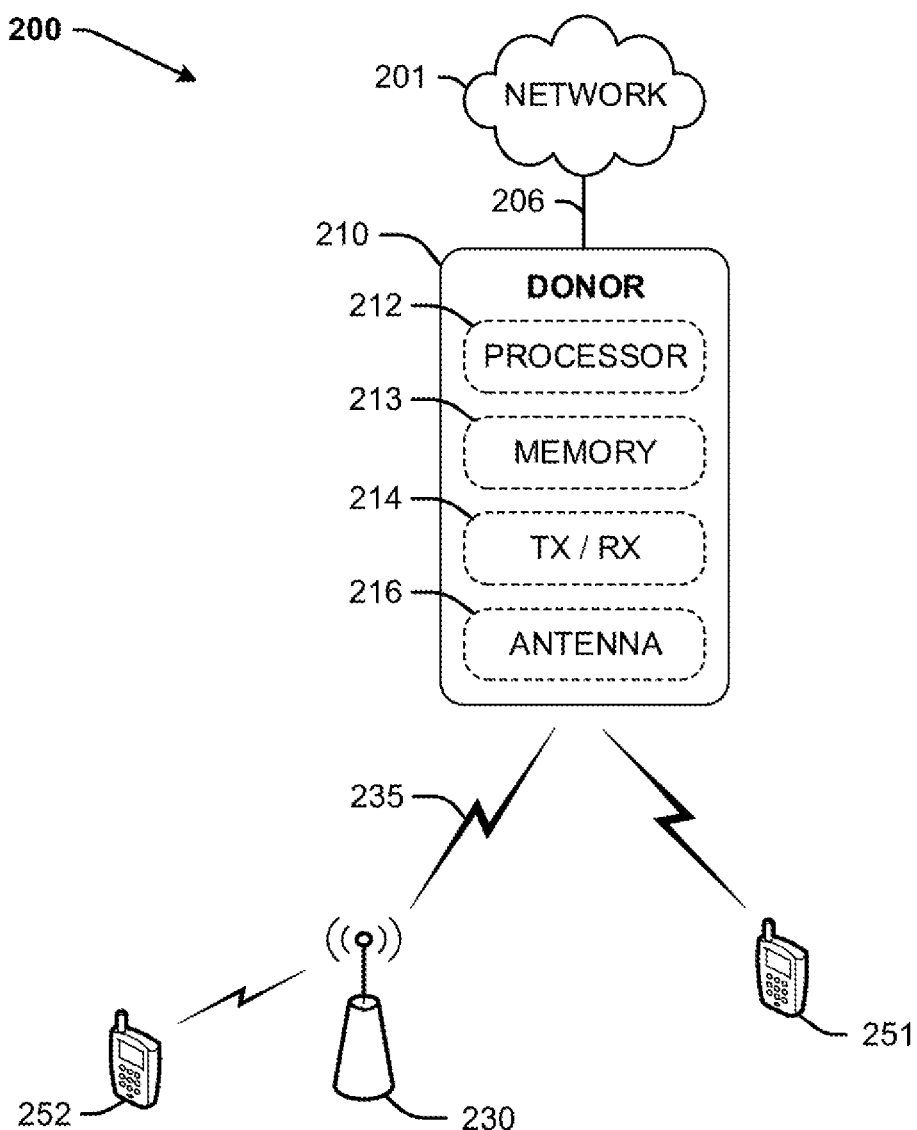
FIG. 2 is a schematic diagram of a system highlighting details of a donor access node in accordance with the present disclosure.

FIG. 2 is a schematic diagram of a system 200, for example, a cellular network, highlighting details of a donor access node in accordance with the present disclosure. System 200 can comprise donor access node 210. Donor access node 210 can comprise, for example, a macro-cell access node, such as donor access node 110 described with reference to FIG. 1. Donor access node 210 is illustrated as comprising a processor 212, a memory 213, a transceiver 214, and an antenna 216. Processor 212 can execute instructions stored on memory 213, while transceiver 214 and antenna 216 can provide wireless communication with relay node 230 and wireless device 251.

Figure 3:
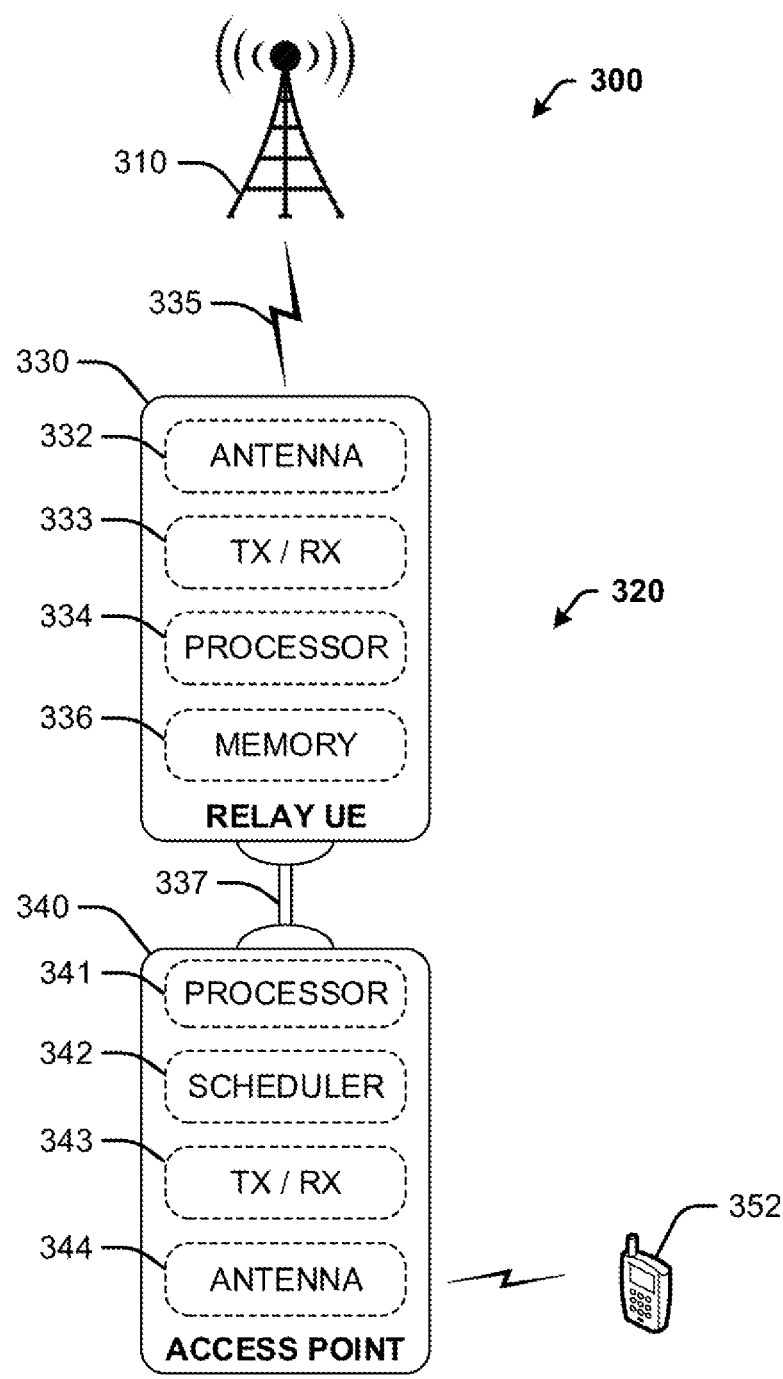
FIG. 3 is a schematic diagram of a system highlighting details of a two-part relay node in accordance with the present disclosure.

FIG. 3 is a schematic diagram of a system 300, for example, a cellular network, highlighting details of a two-part relay node 320 in accordance with the present disclosure. Two-part relay node 320 comprises a relay wireless device 330 and a relay access point (AP) 340. Relay wireless device 330 is illustrated as comprising an antenna 332 for direct communication with donor access node 310 via wireless backhaul link 335, a transceiver 333, a processor 334, and a memory 336 for storing instructions for relay wireless device 330 to perform operations described herein. Relay wireless device 330 can comprise a customer premise equipment (CPE), which can include any stationary LTE wireless device having a stronger computational and radiofrequency (RF) capability versus standard wireless devices, as well as a directional antenna and a dedicated power supply, for relay wireless device 330 to efficiently provide resources to wireless device 352 via relay access point 340. Relay access point 340 is illustrated as comprising an antenna 341 and transceiver 342 for communication with wireless device 360, processor 343, and a memory 344 for storing instructions that are executed by processor 343. Relay access point 340 can be, for example, a home eNodeB or any other type of access node in accordance with any RAT. Relay access point 340 can be co-located with relay wireless device 330. Relay access point 340 can be connected to relay wireless device 330 via a communication interface 337. Communication interface 337 can be any interface that permits direct communication between relay wireless device 330 and relay access point 340, such as USB, FireWire, Ethernet, or any other serial, parallel, analog, or digital interface. Additional transceivers can be incorporated in order to facilitate communication across interface 337 and other network elements.

Relay wireless device 330 can be configured to relay network services from donor access node 310 to wireless device 352 via relay access point 340. Relay wireless device 330 can begin to function as a relay wireless device by sending a message to donor access node 310 to indicate to donor access node 310 that wireless device 330 is functioning as a relay wireless device. For example, relay wireless device 330 can request to send a buffer status report to donor access node 310. Donor access node 310 can grant this request in a conventional manner. Relay wireless device 330 can respond to the grant by sending a short buffer status report. This short buffer status report can be associated with a logical channel group that indicates the buffer status report is communicating the status of relay wireless device 330 as a relay. After the status of relay wireless device 330 is established, relay wireless device 330 can instruct relay access point 340 to start accepting connection requests from one or more wireless devices such as wireless device 352.

Figure 4:
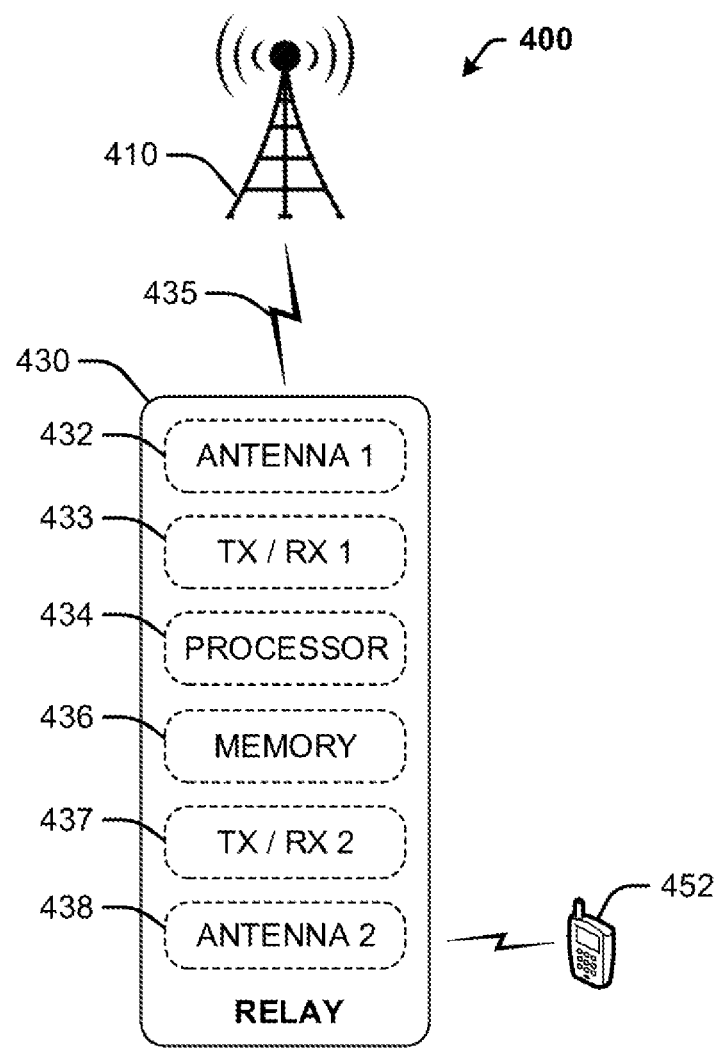
FIG. 4 is a schematic diagram of a system highlighting details of a one-part relay node in accordance with the present disclosure.

FIG. 4 is a schematic diagram of a system 400, for example, a cellular network, highlighting details of a one-part relay node 430 in accordance with the present disclosure. Relay node 430 is illustrated as comprising an antenna 432 for direct communication with donor access node 410 via wireless backhaul link 435, a transceiver 433, a processor 434, and a memory 436 for storing instructions that are executed by processor 434. Relay node 430 further includes another transceiver 437 and antenna 438 for communication with wireless device 452. Relay node 430 can perform operations similar to those described with respect to FIG. 3.

Figure 5:
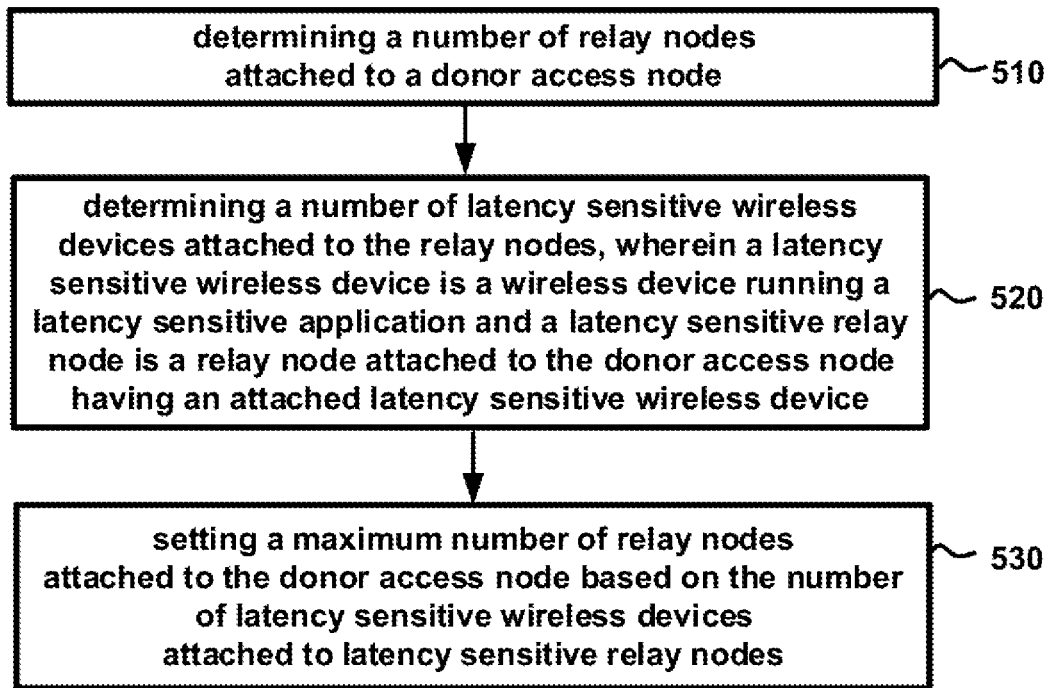
FIG. 5 is a flow diagram of a method in accordance with the present disclosure.

FIG. 5 depicts a method 500 in accordance with the present disclosure. A number of relay nodes attached to a donor access node can be determined at step 510. A number of latency sensitive wireless devices attached to the relay nodes can be determined at step 520. A latency sensitive wireless device can be a wireless device running a latency sensitive application, for example, VoLTE. A latency sensitive relay node can be a relay node attached to the donor access node having an attached latency sensitive wireless device. The method can further comprise determining a number of latency sensitive wireless devices attached directly to the donor access node.

Any appropriate measurement of nodes and/or wireless devices can be made, for example, one or more of the following with the understanding that managing the number of relay nodes can comprise managing the load in a network, a group of cells, a given cell, a group of relay nodes, or any combination thereof. The measurement can be made generally and/or with respect to latency sensitive applications, latency sensitive relay nodes, latency sensitive wireless devices, or any combination thereof. For example, the number of relay nodes handling latency sensitive communication in a group of neighboring cells can be managed so that any one relay node, donor access node, or both is not overly burden such that QoS is affected for wireless device users running latency sensitive application. Measurements can be tailored to achieve such management. The number of relay nodes in communication with a donor access node can be measured. The number of latency sensitive relay nodes in communication with a donor access node can be measured. The number of latency sensitive wireless devices in communication with each latency sensitive relay node can be measured. The number of latency sensitive wireless devices in direct communication with a donor access node can be measured. The total number of latency sensitive wireless devices comprising latency sensitive wireless devices in direct communication with a donor access node and latency sensitive wireless devices in communication with the donor access node via any latency sensitive relay node, or both can be measured. Usage of latency sensitive applications, for example, VoLTE, can be measured.

Relative numbers of total wireless devices in adjoining cells, total relay nodes in adjoining cells, wireless devices attached to two different relay nodes in the same cell, or wireless devices attached to two different relay nodes in adjoining cells, or any combination thereof can be considered in deciding how to balance and transfer wireless devices between relay nodes, between donor access nodes, or both. Usage of latency sensitive applications, for example, VoLTE, can also be considered. These considerations can be made generally and/or with specific consideration of the numbers of latency sensitive relay nodes and latency sensitive wireless devices.

A first latency sensitive relay node with a greater number of latency sensitive wireless devices, for example, running VoLTE, attached can be weighed more heavily than a second latency sensitive relay node with fewer latency sensitive wireless devices attached. The second latency sensitive relay node can be a candidate, for example, for receiving one or more latency sensitive and/or non-latency sensitive wireless devices from the first latency sensitive relay node. A first donor access node with a greater number of latency sensitive wireless nodes attached can be weighed more heavily than a second donor access node having fewer latency sensitive wireless nodes attached. A first donor access node with a greater total number of latency sensitive wireless devices attached, directly and indirectly through relay nodes, can be weighed more heavily than a second donor access node having fewer total latency sensitive wireless devices attached.

Combined weights for a donor access node, for example, can be considered with respect to wireless devices and relay nodes. Weights can factor ratios, for example, a ratio of latency sensitive relay nodes to total relay nodes, a ratio of latency sensitive wireless devices to total wireless devices, or both, with respect to a cell, a group of cells, and/or a cellular network. Usage of latency sensitive applications, for example, VoLTE, can be factored into weights. Priorities, relative weights, or both can be established in determining how and where relay nodes, wireless devices, or both, are weighed, located, handed over, or otherwise treated. For example, a first donor access node having a greater total number of relay nodes attached could outweigh a second donor access node having a greater number of latency sensitive relay nodes attached but fewer total number of relay nodes attached than the first donor access node, or the donor access nodes could be weighed vice versa. In another example, a first donor access node having a greater number of latency sensitive relay nodes attached could outweigh a second donor access node having a greater total number of latency sensitive wireless devices. Such a scenario could result, for example, in handover of one or more latency sensitive relay nodes to the second donor access node, reapportionment of latency sensitive wireless devices amongst total relay nodes attached to the first donor access node, or handover of one or more latency sensitive wireless devices from the second donor access node to the first donor access node, or any combination thereof.

A maximum number of relay nodes attached to the donor access node can be set at a step 530, for example, based on the number of latency sensitive wireless devices attached to latency sensitive relay nodes. Setting the maximum number of relay nodes attached to the donor access node can be further based on a number of latency sensitive relay nodes attached to the donor access node. The number of relay nodes attached to a given donor node can comprise the number of latency sensitive relay nodes attached to that donor node. These relay nodes can be relaying data associated with latency sensitive applications, for example, VoLTE.

Setting the maximum number of relay nodes attached to the donor access node can be further based on the number of latency sensitive wireless devices attached directly to the donor access node. These wireless devices can be running one or more latency sensitive application, for example, VoLTE. Setting the maximum number of relay nodes attached to the donor access node can be further based on a quality of service (QoS) parameter. Setting the maximum number of relay nodes, measuring a QoS parameter, deciding how to reduce the number of relay nodes, deciding when to reduce the number of relay nodes, deciding which relay nodes to handover, or choosing a handover target, or any combination thereof, for example, can comprise measuring the QoS parameter directly or indirectly, a load, a capacity, or combination thereof for a donor access node, a relay node, or both.

Measuring can comprise any appropriate method or combination of measurements and measurement techniques. Measurements can made with respect to a single donor access node or for a group of donor access nodes, for example, neighboring donor access nodes. The group can comprise donor access nodes that are candidates for sending and/or receiving relay nodes and/or individual wireless devices for handover dependent on or independent of whether a relay node and/or wireless device is latency sensitive. Measurements can made with respect to a single relay node or for a group of relay nodes. The group can comprise donor access nodes that are candidates for sending and/or receiving wireless devices for handover, generally or specifically with respect to latency sensitive wireless devices. The group can include, for example, relay nodes generally, exclusively latency sensitive relay nodes, or a mix of latency sensitive and non-latency sensitive relay nodes. Relay nodes can be relaying data associated with latency sensitive applications, for example, VoLTE.

The number of relay nodes attached to a given donor access node can equal, can be less than, or can exceed the maximum number of relay nodes set for that donor access node. The method can further comprise reducing the number of relay nodes attached to the donor access node based on the maximum number of relay nodes set. Reduction can occur once the maximum number of relays nodes is reached or can occur within a set numerical range of relay nodes. That is, the "maximum number" is not necessarily a specific number, but can also be a range of numbers. The range can have defined lower and upper boundaries (number of relay nodes). This window can permit flexibility in reducing the number of relay nodes so that potential handover scenarios can be considered by the system before the upper number is reached. For example, reduction can be delayed after exceeding the lower boundary of the maximum range if a suitable reduction scenario is not present. Whether the maximum number of relay nodes is a discrete number or a range, reduction can be delays by incorporating a measurement window or time span. For example, if the number of relay nodes continues to exceed the maximum number set for the duration of the window, then reduction would proceed. However, if the number of relays drops below the maximum number set at some point during that window, the reduction can be cancelled. Hysteresis can be employed with respect to the maximum number of relay nodes and the associated reduction if exceeded.

The reduction of relay nodes can comprise reducing the number of latency sensitive relay nodes attached to the donor access node. Relay nodes can be relaying data associated with latency sensitive applications, for example, VoLTE. The reduction can comprise reducing the number of latency sensitive wireless devices attached to a latency sensitive relay node. A particular latency sensitive relay node can have all latency sensitive wireless devices removed such that the relay node is no longer considered to be a latency sensitive relay node. The reducing can comprise handing over a relay node, for example, to a neighboring donor access node. The reducing can comprise handing over a latency sensitive relay node. The handing over can comprise handing over a relay node, wireless device, or both to another frequency bandwidth, another donor access node, or another radio access technology (RAT), or a combination thereof.

Physical resource block (PRB) utilization can be measured, allocated, or both for donor access nodes, relay nodes, and wireless devices, generally and/or with specifically with respect to latency sensitive applications in accordance with the present disclosure. PRB utilization can be used as one or more factors in determining whether a handover of a relay node, a wireless device, or both should be made and the target, for example, to another relay node, another donor access node, or both. PRB utilization measurement, allocation, or both can be performed dynamically, with a predetermined periodicity, or both. PRB utilization can be considered with respect to latency specific applications, for example, VoLTE.

QoS parameters can include, for example, one or more of a QoS Class Indicator (QCI) of the radio bearer, a priority, a delay, a loss rate, a guaranteed bit rate, or any other parameter. Adjusting the QCI can trigger other adjustments, as provided by a network configuration. A new QoS parameter can be the same as a default QoS parameter associated with a bearer of a directly-connected wireless devices running a latency sensitive application, for example, a voice application. QoS parameters can be general or specific to latency sensitive applications, for example, VoLTE.

Handover can occur, for example, when a quality of service (QoS) threshold amount is reached and the method further comprises at least one QoS parameter. The at least one QoS parameter can comprise, for example, reference signal received power (RSRP), reference signal received quality (RSRQ), jitter (variation in latency), block error rate (BLER), mean opinion score (MOS), or power headroom, or any combination thereof. The QoS parameter can be adjusted based on a number of latency sensitive relay nodes, latency sensitive wireless devices, or both. Numbers of non-latency sensitive relay nodes, wireless devices, or both can be additionally or alternatively considered. Relay nodes can be relaying data associated with latency sensitive applications, for example, VoLTE.

Any appropriate handover event associated with any radio access technology (RAT) can be used by the methods, processing nodes, and systems of the present disclosure. For example, any relevant LTE handover event can be used, for example, A1, A2, A3, A4, A5, A6, B1, B1-NR, B2, B2-NR, C1, C2, W1, W2, V1, V2, H1, and H2, or corresponding designation in another RAT. Handover to a different RAT can comprise handover to, for example, 2G, 3G, 4G, or 5G, or any combination thereof. Handover can comprise, for example, circuit switched fallback (CSFB), enhanced single radio voice call continuity (eSRVCC), or both. Hardware for different RATs can be colocalized at a given donor access node and/or relay node location or be remote from another at any desired or appropriate distance.

Measurements for handover, for example, can be performed in an idle mode, a connected mode, or both. In idle mode, measurement can be for cell selection and reselection. The idle mode measurement criteria can be determined, for example, by system information block (SIB) messages. The connected mode measurement can be used for handover or circuit switch fall back (CSFB). The connected mode measurement criteria can be determined by radio resource control messaged for a particular wireless device.

An access node can send a RRC message indicating what is to be measured. The wireless device or relay node can send a RRC message regarding the measurement made. A measurement report can be made before handover. The report can include signal quality, for example RSRP for the serving cell and the target cell. Methods for setting target value/threshold can include, for example, an absolute value-type threshold or an offset/relative value-type threshold. Hysteresis or a value range can be used as a threshold. A wireless device can measure cell power/signal quality of a target cell and report the measurement to the network. The network can determine whether the handover should occur. Serving and target cells can have the same or different frequencies. A measurement gap can occur with the serving cell during which the wireless device or relay node communicates with the target cell to perform a signal quality measurement.

Reference Signal Received Power (RSRP) corresponds to UMTS CPICH Received Signal Code Power (RSCP). Reference Signal Received Quality (RSRQ) corresponds to UMTS CPICH Ec/io. RSRP and RSRQ can be used for cell selection, re-selection, and handover. RSRP can also be used to estimate path loss in calculating power control. RSRP can be the average power received from a single reference signal resource element. SIB3 can inform the wireless device of the maximum measurement bandwidth for intra frequency cell reselection and whether a second antenna is to be used for the measurement. SIB5 can also be used. RSRP measurements in dBm can be converted into integer numbers ranging from 0-97. RSRQ can be calculated by dividing RSRP by a received signal strength indicator (RSSI) over the number of resource blocks (N) the RSSI is measured. RSSI can be calculated as a linear average of the total power measured across OFDMA symbols that contain reference symbols transmitted from a first antenna port. The RSSI is a parameter that provides information about total received wide-band power, measured in symbols, including interference and thermal noise. RSRQ can also consider the antenna connector of a wireless device as a reference point. RSRQ can be converted from dBm to an integer number with values ranging from 0-34.

Transmission time interval (TTI) bundling can be used in management of, for example, donor access nodes, relay nodes, and/or wireless devices in accordance with the present disclosure. TTI bundling can be implemented at any suitable time, for example, before a handover is triggered to delay the handover. TTI bundling can be implemented based on measured signal-to-interference noise ratio (SINR), physical resource block (PRB) utilization, or power headroom, or a combination thereof. TTI bundling can be used, for example, in association with a maximum number range of relay nodes to help delay a relay node reduction until closer to the upper boundary of the set range. Dynamic and/or semi-persistent signaling (SPS) can be used in accordance with the present disclosure. Relay nodes can be relaying data associated with latency sensitive applications, for example, VoLTE.

Figure 6A:
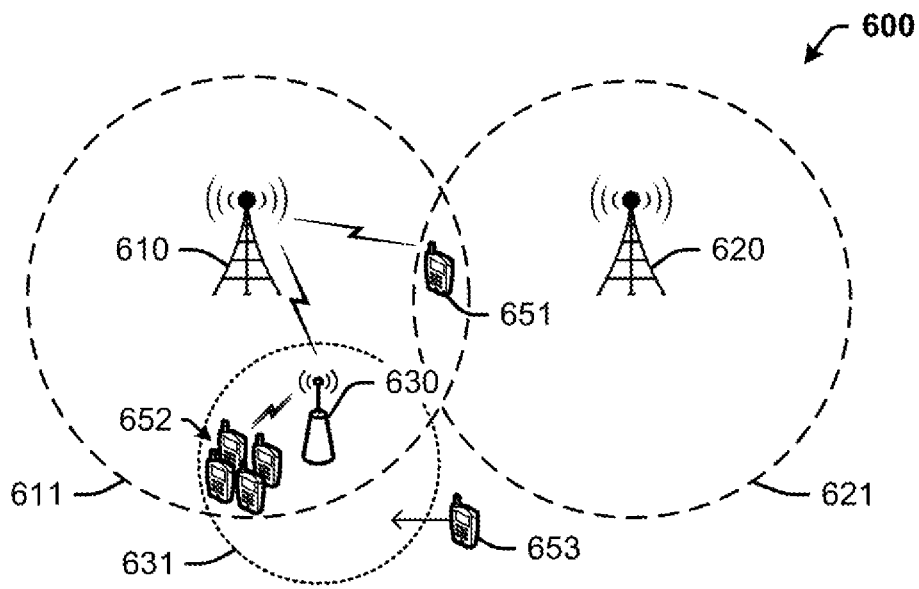
FIGS. 6A-6B are schematic diagrams of a handover event in a cellular network in accordance with the present disclosure.
Figure 6B:
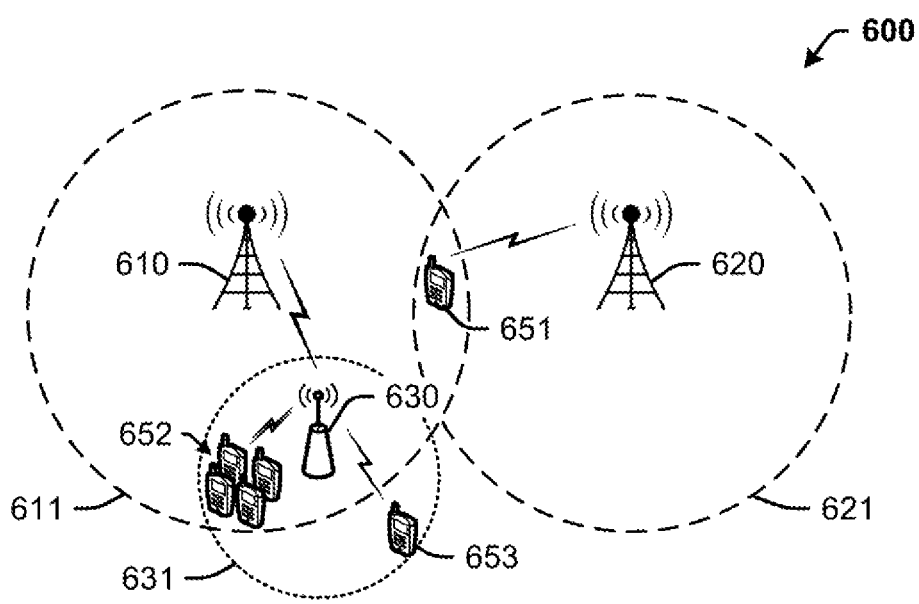

FIGS. 6A-6B are schematic diagrams depicting a handover event in a system, for example, a cellular network in accordance with the present disclosure. System 600 comprises donor access node 610, neighboring access node 620, relay node 630, and wireless devices 651, 652, 653. Donor access node 610 can be considered equivalent to donor access node 110 in system 100, relay node 630 can be considered equivalent to relay node 130, and wireless devices 651-653 can be considered equivalent to wireless devices 151-153. Donor access node 610 helps define coverage area 611, and donor access node 620 help define coverage area 621. Coverage areas 611, 621 can also be treated as large cells. Relay node 630 can help define coverage area 631, which in turn, along with plurality of wireless devices 652, can be treated as a small cell.

With reference to FIG. 6A, wireless device 651 is illustrated as being near an edge of coverage area 611, and within range of coverage area 621 of neighboring access node 620. Plurality of wireless devices 652 is located near the cell edge of coverage area 611 and within coverage area 631 of relay node 630, thereby attaching to relay node 630 rather than directly connecting to (and potentially overloading) donor access node 610. Wireless device 653 is illustrated as being outside both coverage areas 611 and 653 but moving towards coverage area 611. Subsequently, with respect to FIG. 6B, wireless device 653 is illustrated as being within coverage area 611 and attaching to relay node 630, and indirectly to donor access node 610. Thus, system 600 is configured to handover wireless device 651 to donor access node 610 from donor access node 620. Alternatively, or additionally, relay node 630 and, optionally, one or more of the plurality of wireless devices 652 could be handed over from donor access node 610 to donor access node 620. Such a handover could occur, for example, if a maximum number of relay nodes attached to donor access node 610 has been exceeded. Relay node 630 can be a latency sensitive relay node. Wireless device 651, wireless device 653, or both can be latency sensitive wireless devices. One or more of the plurality of wireless devices 652 can be a latency sensitive wireless device.

System 600 can be further configured to reduce the number of relay nodes attached to donor access node 610 based on the maximum number of relay nodes set. The reduction can comprise reducing the number of latency sensitive wireless devices attached to a latency sensitive relay node attached to donor access node 610. The reducing can comprise handing over a relay node, for example, to donor access node 620.

A communication system in accordance with the present disclosure, for example, can comprise a plurality of coverage areas comprising a plurality of central loci. The communication system can further comprise a plurality of cells comprising a plurality of access nodes. The plurality of cells can comprise the serving and target cells. The plurality of access nodes can comprise the first and second access nodes. Each cell of the plurality cells can be, for example, a sectorized cell. Each coverage area can comprise at least two access nodes at a central locus and at least two sectorized cells. The plurality of coverage areas can comprise a first and a second coverage area. The first coverage area can comprise a first central locus. The second coverage area can comprise a second central locus. The first access node can be at the first central locus. The second access node can be at the second central locus. The first coverage area can comprise the serving cell. The second coverage area can comprise the target cell. Each coverage area can comprise, for example, three sectorized cells and three access nodes at each central locus from which the sectorized cells originate. Each sectorized cell can have, for example, an angle of approximately 120 degrees emanating from its respective access node. The plurality of cells can be oriented from true north at a common set of three grid angles.

In system 600, coverage area 611 can define a first large cell comprising donor access node 610, which can be considered as a first access node. Coverage area 621 can define a second large cell comprising donor access node 620, which can be considered as a second access node. Coverage area 631 can define a first small cell, for example, a mini-macro, comprising relay node 630, which can be considered, for example, as a first latency sensitive relay node configured for relaying latency sensitive communications between any in-range latency sensitive active wireless device and the first access node or the second access node. There can also be a second small cell comprising a second latency sensitive relay node configured for relaying latency sensitive communications between any in-range latency sensitive active wireless device and the first access node or the second access node. A small cell comprising at least one latency sensitive relay node can be considered a latency sensitive small cell.

System 600 can be configured to perform one or more method of the present disclosure. System 600 can comprise a processing node. Relay node 630 can comprise a relay wireless device and a relay access point, for example, as depicted in FIG. 3 and described herein. Any appropriate relay node can be used. A small cell, whether latency sensitive or otherwise, can be handed over in whole or part from a first large cell to a second large cell. That is, the entire small cell inclusive of both the relay node and one or more wireless devices attached thereto can be handed over or at least the relay node. One or more wireless devices attached to the relay node can be detached from the relay node before, during, or after handover. A large cell and/or its donor access node can also be considered to be latency sensitive if it comprises at least one latency sensitive relay node, at least one latency sensitive wireless or both. A large cell, a small cell, or both can be omnidirectional or sectorized.

Embodiments can include any number or kind of cell. Cells can comprise omnidirectional cells, sectorized cells, or both. For example, a sectorized cell can be about 60 degrees, about 90 degrees, about 120 degrees, about 180 degrees, about 270 degrees, or any other angle between 0 and 360 degrees. Sectorized cells in the system can be oriented in a common grid system relative to true north. Although certain figures show embodiments as employing omnidirectional cells, for example, in FIGS. 1, 6A, and 6B, that is for simplicity of illustration, and such embodiments can also employ sectorized cells, and vice versa.

In addition to the systems described herein, these operations can further be implemented as computer-readable instructions or methods, and processing nodes on the network for executing the instructions or methods. For example, a processing node coupled to a donor access node or a relay node can be configured to perform the methods described herein. The methods, systems, devices, networks, access nodes, and equipment described herein can be implemented with, contain, or be executed by one or more computer systems and/or processing nodes. The methods described above can also be stored on a non-transitory computer readable medium. Many of the elements of system 100, system 600, or the like, can be, comprise, or include computers systems and/or processing nodes. These include, but is not limited to access node 110, relay node 120, controller node 104, and/or network 101.

Figure 7:
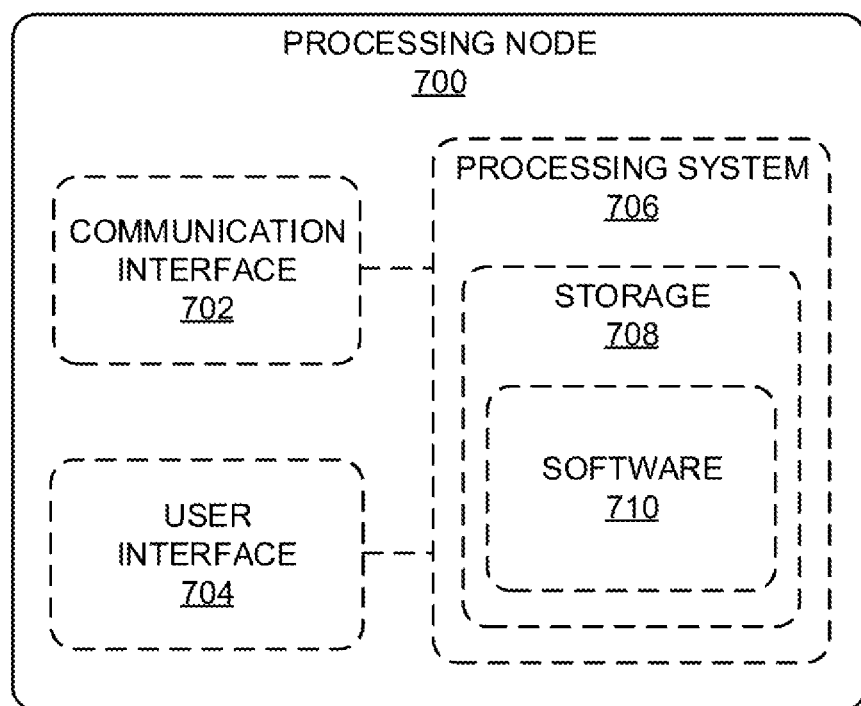
FIG. 7 is a schematic diagram of a processing node in accordance with the present disclosure.

FIG. 7 is a schematic diagram of a processing node 700 in accordance with the present disclosure. Processing node 700 comprises a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 can include a disk drive, flash drive, data storage circuitry, or some other memory apparatus. For example, storage 708 can include a buffer. Software 710 can include computer programs, firmware, or some other form of machine-readable instructions, including an operating system, utilities, drivers, network interfaces, applications, or some other type of software. For example, software 710 can include a module for performing transmission power control operations described herein. Processing system 706 can include a microprocessor and other circuitry to retrieve and execute software 710 from storage 708. Processing node 700 can further include other components such as a power management unit, a control interface unit, etc., which are omitted for clarity. Communication interface 702 permits processing node 700 to communicate with other network elements. User interface 704 permits the configuration and control of the operation of processing node 700.

The processing node can reduce the number of relay nodes attached to the donor access node when the number of relay nodes exceeds the maximum number of relay nodes set. The reducing can comprise, for example, handing over a relay node to another frequency bandwidth, another donor access node, or another radio access technology (RAT), or a combination thereof. The processing node can be located at any appropriate location or locations in the wireless network. Wireless networks in accordance with the present disclosure can comprise licensed radiofrequency (RF) spectrum, unlicensed RF spectrum, or both. The licensed RF spectrum can be associated with a particular licensee or carrier, or a multiple licensees or carriers.

The exemplary systems and methods described herein can be performed under the control of a processing system executing computer-readable codes embodied on a computer-readable recording medium or communication signals transmitted through a transitory medium. The computer-readable recording medium can be any data storage device that can store data readable by a processing system, and includes, for example, both volatile and nonvolatile media, removable and non-removable media, media readable by a database, a computer, or various other network devices, or any combination thereof.

Examples of the computer-readable recording medium include, for example, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium can include, for example, modulated signals transmitted through wired or wireless transmission paths.

The above description and associated figures teach the best mode of the disclosure. Those skilled in the art will appreciate that the features described above can be combined in various ways to form multiple variations of the disclosure. As a result, the disclosure is not limited to the specific embodiments described above.

What is claimed is:

1. A method comprising:
   determining a number of relay nodes attached to a donor access node;
   determining a number of latency sensitive wireless devices attached to the relay nodes, wherein a latency sensitive wireless device is a wireless device running a latency sensitive application and a latency sensitive relay node is a relay node attached to the donor access node having an attached latency sensitive wireless device; and
   setting a maximum number of relay nodes attached to the donor access node based on the number of latency sensitive wireless devices attached to latency sensitive relay nodes.

2. The method of claim 1, wherein the setting is further based on a number of latency sensitive relay nodes attached to the donor access node, the number of relay nodes comprising the number of latency sensitive relay nodes.

3. The method of claim 1, further comprising determining a number of latency sensitive wireless devices attached directly to the donor access node, wherein the setting is further based on the number of latency sensitive wireless devices attached directly to the donor access node.

4. The method of claim 1, wherein the setting is further based on a quality of service (QOS) parameter.

5. The method of claim 1, wherein the number of relay nodes exceeds the maximum number of relay nodes set.

6. The method of claim 1, further comprising reducing the number of relay nodes attached to the donor access node based on the maximum number of relay nodes set.

7. The method of claim 6, wherein a number of latency sensitive relay nodes attached to the donor access node is reduced.

8. The method of claim 7, wherein the reduction comprises reducing the number of latency sensitive wireless devices attached to a latency sensitive relay node.

9. The method of claim 6, wherein the reducing comprises handing over a relay node.

10. The method of claim 9, wherein the reducing comprises handing over a latency sensitive relay node.

11. The method of claim 9, wherein the handing over comprises handing over to another frequency bandwidth, another donor access node, or another radio access technology (RAT), or a combination thereof.

12. The method of claim 1, wherein the latency sensitive application comprises a voice application.

13. A processing node configured to perform a method of maintaining quality of service for a wireless device running a latency sensitive application, the method comprising:
    determining a number of relay nodes attached to a donor access node;
    determining a number of latency sensitive wireless devices attached to relay nodes, wherein a latency sensitive wireless device is a wireless device running a latency sensitive application and a latency sensitive relay node is a relay node attached to the donor access node having an attached latency sensitive wireless device; and
    setting a maximum number of relay nodes attached to the donor access node based on the number of latency sensitive wireless devices attached to latency sensitive relay nodes.

14. The processing node of claim 13, further comprising reducing the number of relay nodes attached to the donor access node when the number of relay nodes exceeds the maximum number of relay nodes set.

15. The processing node of claim 14, wherein the reducing comprises handing over a relay node to another frequency bandwidth, another donor access node, or another radio access technology (RAT), or a combination thereof.

16. A cellular network system:
    a first donor access node;
    a second donor access node; and
    a plurality of relay access nodes configured to attach to the first or second donor access nodes, wherein the system is configured to:
        determine a number of relay nodes comprised by the plurality of relay nodes that are attached to the first donor access node;
        determine a number of latency sensitive wireless devices attached to a relay node attached to the first donor access node, wherein a latency sensitive wireless device is a wireless device running a latency sensitive application and a latency sensitive relay node is a relay node attached to the first or second donor access node; and
        set a maximum number of relay nodes attached to the first donor access node based on the number of latency sensitive wireless devices attached to latency sensitive relay nodes that are attached to the first donor access node.

17. The system of claim 16, further configured to reduce the number of relay nodes attached to the first donor access node based on the maximum number of relay nodes set.

18. The system of claim 17, wherein the reduction comprises reducing the number of latency sensitive wireless devices attached to a latency sensitive relay node attached to the first donor access node.

19. The system of claim 17, wherein the reducing comprises handing over a relay node.

20. The system of claim 19, wherein the handing over comprises handing over the relay node to the second donor access node.

* * * * *